UNITED STATES PATENT OFFICE.

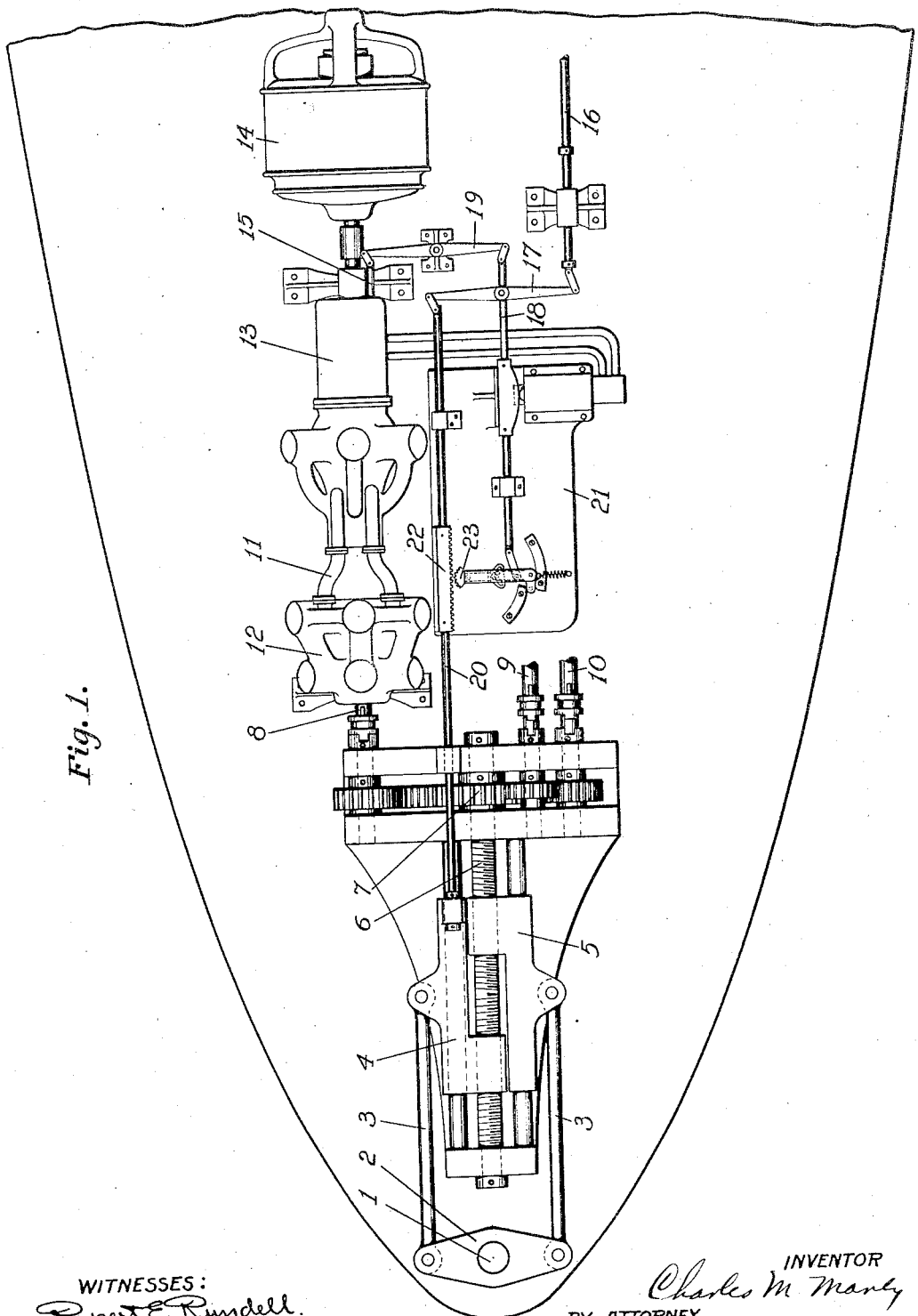

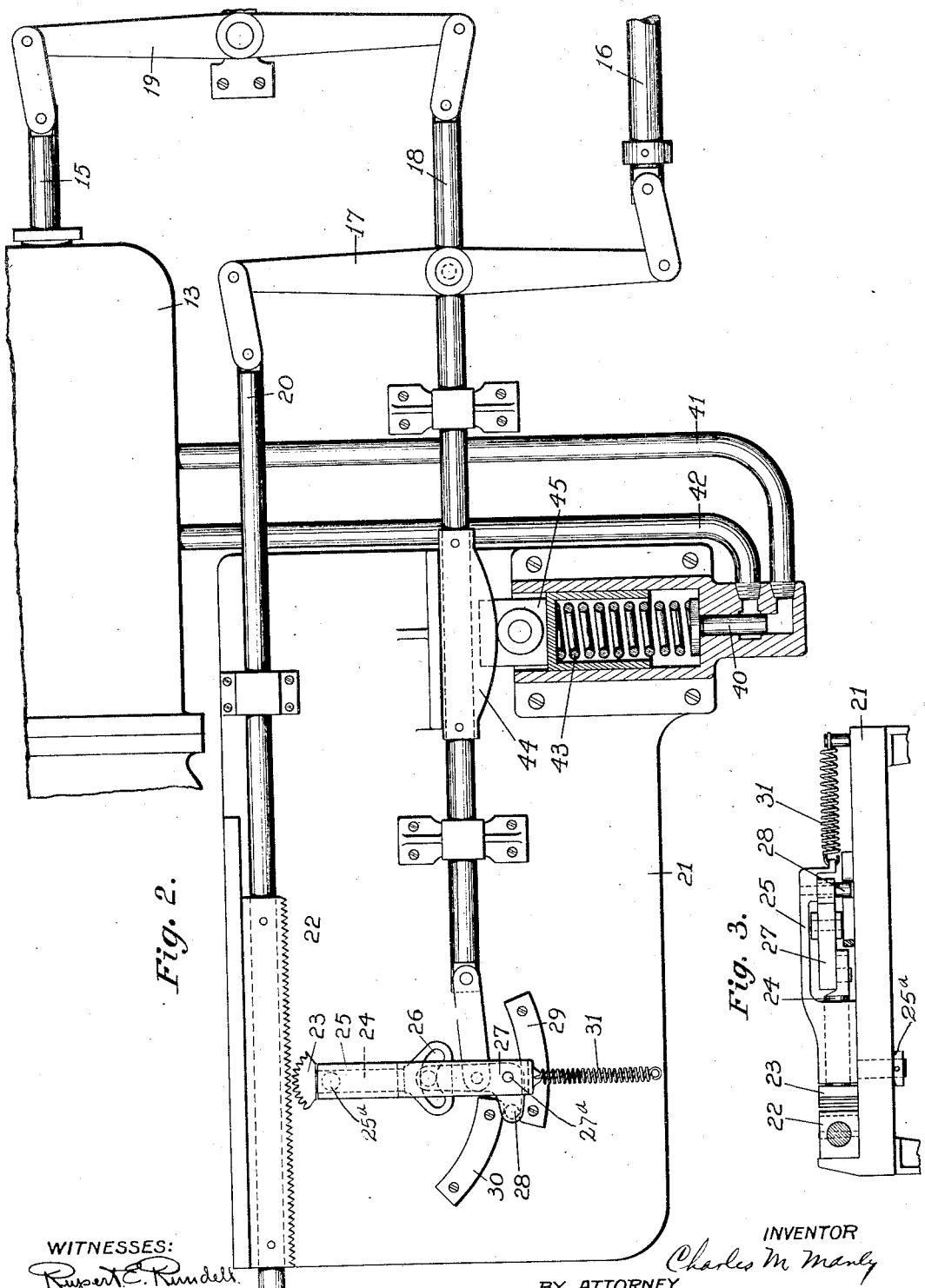

CHARLES M. MANLY, OF BUFFALO, NEW YORK.

STEERING-GEAR FOR SHIPS.

1,385,840.

Specification of Letters Patent.   Patented July 26, 1921.

Application filed August 23, 1917. Serial No. 187,895.

*To all whom it may concern:*

Be it known that I, CHARLES M. MANLY, a citizen of the United States, and a resident of Buffalo, county of Erie, and State of New York, have invented new and useful Improvements in Steering-Gears for Ships, of which the following is a specification.

This invention relates to steering gear for ships, and has for its object to provide a power driven steering apparatus which will be quickly responsive to the operation of the steering wheel; which will positively adjust the rudder to the exact position of adjustment of the steering wheel; and which will move the rudder under normal conditions at a speed proportional to the speed of movement of the manually operated element.

A further object of the invention is to provide a steering gear in which the load that may come upon the prime mover is positively limited to a predetermined maximum regardless of the resistance which may be encountered by the rudder at the moment of its attempted adjustment. In the preferred embodiment of my invention I can use as a prime mover an electric motor without danger of injury to the motor or connected apparatus through overloading.

My invention also provides an automatic coördinating connection between the rudder and its operating gear which permits the speed of the rudder to be accelerated as rapidly as desired within the maximum horse power of the prime mover without danger of overloading the motor.

With the above objects in view, my invention consists of a hydraulic variable speed gear having suitable power transmitting connections with the rudder and a control mechanism for such gear by means of which the above described functions are obtained.

In the accompanying drawings, I have illustrated the preferred embodiment of my invention, and in said drawings, Figure 1 is a diagrammatic view of the stern of a vessel showing my improved mechanism in plan;

Fig. 2 is an enlarged view of a portion of the mechanism shown in Fig. 1; and Fig. 3 is an end view of the mechanism shown in Fig. 2.

Referring to the drawings, particularly Fig. 1, 1 represents the steering post of the vessel to which is connected the usual cross arm 2. To each end of the cross arm a link 3 is connected which links are pivotally connected to right and left hand nuts 4 and 5 slidably mounted on suitable guide rods and threaded on the right and left hand screw 6 through the rotation of which the rudder is adjusted. The screw 6 is provided with a suitable master gear 7 which may be rotated by several different mechanisms so that in the event of one mechanism being disabled another mechanism may be immediately brought into play. I have indicated such mechanism by the shafts 8, 9, and 10 respectively of which the shaft 8 is driven from my improved hydraulic mechanism. The shaft 9 may be driven from an auxiliary steam steering gear of any preferred construction and the shaft 10 from a hand capstan for use in emergency when all power mechanisms are disabled. The shafts are provided with clutches by which the mechanism to be used can be rendered operative, and the other mechanisms inoperative.

The shaft 8 forms the driven shaft of a hydraulic variable speed gear 11 preferably of the type disclosed in my prior Patent No. 801,097 of October 3, 1905, or of my copending application #639,464, and whose construction *per se* forms no part of the present invention. This mechanism comprises briefly a hydraulic motor 12 and a variable stroke pump 13 connected together to form a closed circuit whereby the motor will be driven by the fluid under pressure circulated by the pump. The pump shaft is driven at a fixed speed by means of a continuously operated electric motor 14 and the speed of the hydraulic motor is varied by adjusting the pump stroke through the medium of its control rod 15. As described in my prior patent and copending application referred to the pump stroke is adjustable from its zero position of no capacity which corresponds to the middle position of the rod, to any capacity up to the maximum capacity flowing in either direction according to the direction and extent of adjustment of the control rod from its middle neutral position. When the control rod is in its neutral position the motor shaft 8 will be held stationary by the incompressible fluid in the hydraulic circuit and when the rod is moved out of its neutral position the motor will be started with a speed and in a direction determined by the movement of the rod.

The rod 15 is operated from the steering wheel not shown through a second rod 16 and a floating lever 17 which is fulcrumed on a third rod 18, connected through a lever 19 to the control rod 15. The free end of the floating lever 17 is pivoted to the end of a rod or shaft 20 slidingly supported on a table or platform 21 and connected to the nut 4 for movement therewith.

The mechanism so far described forms a complete steering gear but without the safety features above described. Assuming the rudder to be stationary in its middle or straight-ahead position, as shown, and that it is desired to alter the course of the vessel, the rod 16 will be adjusted by the steering wheel, say to the left, as shown in Fig. 1, thereby moving the end of the lever 17 in a corresponding direction. The opposite end of the lever 17 is pivoted to the rod 20 which is stationary at this moment, as the rudder has not begun to move, and acts as the fulcrum of the lever so that the rod 18 will also be adjusted to the left thereby shifting the control rod 15 out of its neutral position, thus starting the hydraulic motor and through the shaft 8, rotating the screw 6 in a direction to cause the nut 4 to move away from the stern of the vessel and rotate the rudder shaft. The movement of the nut 4 causes the rod 20 to move to the right as shown in Fig. 2 and thus tends to move the rod 18 in the same direction which is opposite to its direction of movement as effected by the rod 16, thereby tending to return the control rod 15 to its neutral position.

When the steering wheel has been turned to a position corresponding with the desired position of the rudder the helmsman will stop turning the steering wheel and hold it stationary until the vessel has altered its course to the desired extent, and the rod 16 will also be stopped and held stationary. As soon as the rod 16 is held stationary, the lever 17 will turn on its connection with the rod 16 as a fulcrum under the action of the rod 20. The rod 20 continues its movement as the valve of the hydraulic gear remains open until the rod 15 is restored to its neutral position when the rotation of the motor will cease and the rudder will be held in a position corresponding to the position of the rod 16. It is also obvious that the faster the movement of the rod 16 the greater will be the distance to which the rod 15 is adjusted so that the speed of the hydraulic motor will be fast or slow in accordance with the speed of movement of the rod 16.

The resistance to movement of the rudder varies through wide limits depending upon the movement of the vessel and the condition of the water. It may be that at the moment the helmsman attempts to operate the steering gear the rudder will be subjected to the action of a wave or current adding greatly to its normal resistance to movement. Hence should the helmsman attempt to accelerate the movement of the rudder at a rate which is normally safe, the electric motor would be greatly overloaded and no doubt seriously damaged. To prevent this I provide a mechanism which limits the speed of movement of the rod 16 to the speed at which the rudder responds to such movement. This mechanism comprises a rack 22 attached to and forming part of the rod 20 overlying the platform 21. Coöperating with the rack 22 is a locking member 23 formed on a slide 24 mounted for sliding movement toward and from the rack in a lever 25 pivoted on the platform at 25$^a$. The end of the slide 24 is formed with an arcuate cam slot 26 in which works a pin carried in the end of one arm of a bellcrank 27 pivoted at 27$^a$ near the opposite end of the lever 25. This arm of the bellcrank 27 is connected to the end of the rod 18 by means of a suitable link, and its other arm is provided with a stop-pin 28 which engages certain curved guides 29 and 30 attached to the table top. A light spring 31 holds the lever in its middle position when not shifted by the movement of the rod 18, as will now be described.

Let us assume that the rod 16 is shifted as before. As the spring 31 offers a slight resistance to the movement of the lever 25, the movement of the rod 18 will turn the bellcrank 27 on its pivot, which movement is permitted by the stops 29 and 30 when the lever is shifted slightly from its middle neutral position in either direction. The movement of the bellcrank through the operation of the pin in the cam slot 26 forces the locking member 23 into engagement with the rack thereby preventing further movement of the rod until the rudder has responded. The lost motion permitted by the cam slot 26 is sufficient to start the motor slowly so that the rudder will commence to turn if permitted by the resistance of the waves at that moment. The movement of the rod 20 turns the lever 25 on its fulcrum thereby, if the rod 18 be stationary, turning the cam slot 26 on the cam pin until the lock 23 is released from the rack 22. If the helmsman continue the movement of the rod 16, but no faster than the rudder responds, the rod 18 will remain stationary in the position to which it is adjusted, continuing the operation of the motor at uniform speed, the lever 17 turning on its connection with the rod 18 as a fulcrum without operating the rod. In this operation the pin in the bellcrank 27 remains in the center of the cam slot 26, being held in such position by the engagement of the pin 28 with the stop 30. Were it not for the stop 30 as soon as the lock 23 cleared the rack, the spring 31 would tend to return the lever 25 to its middle position and cause the bellcrank to turn on its pivot beyond this position and again lock the lever to the rod 20.

If the helmsman wishes to bring the driving motor up to full speed as rapidly as permitted by the mechanism he has merely to operate the rod 16 fast enough to keep the lock 23 in engagement with the moving rod 20. The movement of the lever 25 on its fulcrum as effected by the rack 22 will shift the adjusting rod 18 as rapidly as the speed of the hydraulic motor can be safely accelerated.

Without the mechanism above described, should the helmsman attempt to adjust the rudder when the movement of the rudder was heavily resisted by the water, the pump stroke would be adjusted to full speed position before the movement of the rod 16 was prevented. Hence when the rudder was free of the wave it would be started at full speed of the motor thereby seriously overloading the apparatus. With the described mechanism the adjustment to full speed cannot be applied until the part to be driven has gradually been brought up to speed.

To further safeguard the apparatus against sudden shock I preferably provide the fluid circuit of the hydraulic device with a safety valve which I have indicated at 40. This valve closes a passage way between the high pressure pipe 41 and the low pressure pipe 42 of the circuit. In a hydraulic gear of this type the horse power varies with the product of the fluid pressure and the velocity, that is, at low speeds a much higher working pressure may be employed within the same horse power than at higher speeds. The movement of the valve 40 is resisted by a spring 43, but as the fluid pressure varies for a constant horse power according to the speed of the motor, I provide a variable tension for the spring controlled by the adjusting rod 18 so that the safety valve will not blow off until the maximum pressure at the particular speed at which the device is operated, is exceeded. This tension device comprises a cam 44 fast to the rod 18 and engaging a movable abutment 45 for the spring. The cam is so shaped that at the lower speeds of the apparatus a heavy pressure is required to blow off the valve, while at the higher speeds the tension of the spring is proportionately reduced. By this construction the apparatus is protected against damage at all times while permitting the full horse power of the electric motor to be employed at any speed.

Claims:

1. In a mechanism of the class described, the combination of a driving member and a driven member, and means for controlling the said driving member to prevent the speed of said driven member being accelerated at a rate sufficient to overload the driving member beyond a predetermined horse power.

2. In a mechanism of the class described, the combination of a driving member and a driven member, means controlled by the movement of the driven member to prevent the speed of said driven member being accelerated at a rate sufficient to overload the driving member beyond a predetermined horse power.

3. In a mechanism of the class described, the combination of a variable speed gear, a member driven therefrom, means controlled by the movement of said member for preventing the speed ratio of said speed gear being altered more rapidly than the driven member responds to the changes in speed.

4. In a mechanism of the class described, the combination of a driving member and a driven member, a control member, means for varying the speed of movement of the driven member in synchronism with the speed of movement of the control member and means controlled by the driven member for preventing movement of the control member faster than the driven member can respond under a predetermined power of the driving member.

5. In a mechanism of the class described, the combination of a variable speed gear embodying a constantly operated driving member, a member driven therefrom, and a control member for varying the gear ratio of the driving and driven members, means for operating the control member to vary the speed of the driven member in synchronism with the speed of movement of the control member, and means operated by the driven member for limiting the speed of movement of the control member to the speed at which the driven member responds to the changes in speed.

6. In a mechanism of the class described, the combination of a variable speed gear, a member driven thereby, a control member for varying the ratio of said gear to increase the speed of the driven member thereof, means operated by said driven member to operate said control member to reduce the speed of said driven member, and means controlled by the load on said driven member to limit the movement of said control member.

7. In a mechanism of the class described, the combination of a member to be driven, means for driving said member, means for controlling said driving means to start said driven member and increase the speed thereof, means acting in opposition to said control means to reduce the speed of said driven member and stop said member, and means controlled by the load on said driven member for limiting the operation of said control member.

8. In a mechanism of the class described, the combination of a driven member, a variable speed and reverse gear for driving said member and means controlled by the movement of said driven member in either direction for preventing the speed ratio of said variable speed gear being altered more rapidly than said driven member responds to the changes in speed.

9. In a mechanism of the class described, the combination of a member to be driven, a mechanism for driving the member, a manually operatable device for starting the driving mechanism, and means for locking said device to the member to be driven to prevent its operation more rapidly than said member responds to the driving movement.

10. In a mechanism of the class described, the combination of a member to be driven, a mechanism for driving the member, a manually operatable device for starting the driving mechanism, means for locking said device to the member to be driven whenever said device is moved a predetermined extent beyond said driven member, and means for automatically releasing said locking device when the driven member has fully responded.

11. In a mechanism of the class described, the combination of a driving mechanism, a member driven therefrom, means for controlling said driving mechanism comprising a manually operatable element for starting said driving mechanism, an element operated from said driven member having a differential connection with said manually operatable element to stop said driving mechanism when the movement of said manually operatable element is stopped, and means for locking said differential connection to said driven member whenever the manually operatable element is moved a predetermined extent in advance of the driven member.

12. In a mechanism of the class described, the combination of a member to be operated, a driving mechanism including a variable speed gear for operating said member, said speed gear having a control member whose movement in one direction starts said gear and increases its speed ratio in proportion to the extent of movement thereof, an operating member for shifting said control member and having a differential connection therewith, a connection between said member to be driven and the third element of said differential connection, and means for locking said control element to said driven member whenever said operating element is moved to a predetermined extent in advance of said driven member.

13. In a mechanism of the class described, the combination of a part to be operated, driving mechanism including a variable speed gear having a control member whose movement in one direction starts said gear and increases the speed ratio in proportion to the extent of movement thereof, an operating member for shifting said control member and having a differential connection therewith a connection between the part to be operated and the third element of said differential connection, and means for connecting said control member to said part to be operated upon an excess of movement of said operating member to be operated thereby at a fixed ratio to its speed of movement.

14. In a mechanism of the class described, the combination of a part to be operated, driving mechanism including a variable speed gear for operating said part, said speed gear having a control member whose movement starts said gear and increases its speed ratio in proportion to its extent of movement, a manual control means for connecting and disconnecting said control member to said part to be operated thereby.

15. In a mechanism of the class described, the combination of a part to be operated, driving mechanism including a variable speed gear for operating said part, said speed gear having a control member whose movement starts the driven element of said gear and increases its speed ratio in proportion to its extent of movement, a manual control means for connecting and disconnecting said control member to said part to be operated thereby, said means comprising a lost motion connection whereby the movement of the driven element of gear is started before the control member is connected to said part.

16. In a steering gear, the combination of a rudder post, means for operating said post comprising a hydraulic variable speed gear, means controlled by the movement of said rudder post for preventing the speed ratio of said gear being increased faster than the movement of the rudder post responds, and separate means for relieving the fluid pressure in said gear whenever the load thereon exceeds a predetermined horse power.

17. In a mechanism of the class described, the combination of a driving member, a hydraulic variable speed gear inclosed between said members comprising a variable stroke pump, a relief valve on the circuit thereof, connections between said valve and the stroke varying means of said pump whereby the tension on the relief valve is altered in accordance with the change in the pump stroke.

18. In a steering gear or similar apparatus, the combination of a rudder post to be operated, a driving mechanism therefor including a hydraulic variable speed gear, a primary control member for said gear having central or stop position adapted when shifted in the opposite direction to cause the movement of said gear in the corresponding direction and at a speed corresponding to the extent of the movement of said member, a manually operatable control member, connections between the rudder, the primary control member, and the manually operated member embodying a floating lever whereby the movement of the rudder post as effected by the movement of the control member tends to return the control member to its initial position and means operated by an excess movement of the manually operated member for locking said primary control member to said rudder post whereby the manually controlled member cannot be operated faster than the rudder post responds to the movement.

19. In a steering gear, the combination of a rudder post or member to be actuated, means for operating the same comprising a hydraulic variable speed gear, a control member therefor having a central or stop position and adapted when moved out of said position to cause said gear to operate in a corresponding direction, and at a speed proportionate to its extent of movement, a manually operated member, a floating lever having pivotal connection at different points in its length to each of said members, a rod having pivotal connection with said floating lever and connected to said rudder post to be reciprocated in unison with its movement, a rod extending from the lever at its point of connection with the primary control member and extending adjacent said first mentioned rod, and means effected by an excess of movement of said manually controlled member for producing a driving connection between said last two rods whereby the latter can move only at a predetermined multiple of the speed of the former.

Signed at Buffalo in the county of Erie and State of New York this 29th day of March, 1917.

CHARLES M. MANLY.